US012792526B2

(12) United States Patent
Lee et al.

(10) Patent No.: US 12,792,526 B2
(45) Date of Patent: Nov. 10, 2026

(54) SYSTEMS AND METHODS OF IN-MEMORY PREFETCH FOR WIDE-IO NAND MEMORY

(71) Applicant: Samsung Electronics Co., Ltd., Suwon-si (KR)

(72) Inventors: Ho Bin Lee, San Jose, CA (US); Rekha Pitchumani, Oak Hill, VA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 62 days.

(21) Appl. No.: 19/060,622

(22) Filed: Feb. 21, 2025

(65) Prior Publication Data

US 2026/0037453 A1 Feb. 5, 2026

Related U.S. Application Data

(60) Provisional application No. 63/679,012, filed on Aug. 2, 2024.

(51) Int. Cl.

*G06F 12/14* (2006.01)
*G06F 9/30* (2018.01)
*G06F 9/50* (2006.01)

(52) U.S. Cl.

CPC ...... *G06F 12/1483* (2013.01); *G06F 9/30047* (2013.01); *G06F 9/5016* (2013.01); *G06F 12/1441* (2013.01)

(58) Field of Classification Search

CPC .... G06F 9/30047; G06F 9/3814; G06F 9/383; G06F 9/3832; G06F 9/5016; G06F 12/0862; G06F 12/10; G06F 12/1027; G06F 12/109; G06F 12/1441; G06F 12/1483;

(Continued)

(56) References Cited

U.S. PATENT DOCUMENTS 9,734,073 B2 * 8/2017 Chun .................. G06F 12/0862
10,310,980 B2 * 6/2019 Kalwitz .............. G06F 12/0868
10,621,098 B2 * 4/2020 Jo ......................... G06F 3/0679

(Continued)

FOREIGN PATENT DOCUMENTS

KR 20230031123 A * 3/2023 ......... G06F 12/0862

OTHER PUBLICATIONS

Machine translation of KR 20230031123 (Year: 2023).*

*Primary Examiner* — Reginald G Bragdon
*Assistant Examiner* — Aaron D Ho
(74) *Attorney, Agent, or Firm* — Renaissance IP Law Group LLP

(57) ABSTRACT

Provided are systems, methods, and apparatuses for secure in-memory data prefetch for wide-IO NAND memory. In one or more examples, the systems, devices, and methods include allocating a memory region of a first memory type based on an allocation command; receiving, at a controller of the first memory type and from an application of a host, a load instruction configured for a second memory type different from the first memory type; converting a memory address, of the second memory type, from the second memory type to a converted memory address of the first memory type; determining the converted memory address matches a memory address of the memory region; fetching prefetch data from the memory region based on predicting that the application will use the data based on the load instruction; and providing the prefetch data to the application of the host based on the load instruction.

20 Claims, 10 Drawing Sheets

(58) Field of Classification Search
CPC ....... G06F 2212/602; G06F 2212/6024; G06F 2212/6026; G06F 2212/6028
USPC .......................................................... 711/202
See application file for complete search history.

(56) References Cited

U.S. PATENT DOCUMENTS

| | | | | |
|---|---|---|---|---|
| 11,868,245 | B2 * | 1/2024 | Duan | G06F 12/0623 |
| 2008/0250208 | A1 * | 10/2008 | O'Connell | G06F 9/383 711/137 |
| 2009/0157950 | A1 * | 6/2009 | Selinger | G06F 12/08 711/E12.008 |
| 2011/0082965 | A1 * | 4/2011 | Koka | G06F 13/28 710/22 |
| 2013/0132680 | A1 * | 5/2013 | Peleg | G06F 12/0862 711/137 |
| 2016/0055089 | A1 * | 2/2016 | Kim | G06F 9/383 711/137 |
| 2018/0024779 | A1 * | 1/2018 | Kojima | G06F 12/0246 711/103 |
| 2019/0042460 | A1 | 2/2019 | Trika et al. | |
| 2019/0213130 | A1 * | 7/2019 | Madugula | G06F 12/0895 |
| 2019/0286570 | A1 * | 9/2019 | Miura | G06F 12/0246 |
| 2019/0303160 | A1 * | 10/2019 | Greenhalgh | G06F 9/3806 |
| 2019/0340089 | A1 | 11/2019 | Doshi et al. | |
| 2020/0192715 | A1 | 6/2020 | Wang et al. | |
| 2022/0164313 | A1 * | 5/2022 | BenHanokh | G06F 16/148 |
| 2023/0236987 | A1 * | 7/2023 | Elad | G06F 12/10 711/202 |
| 2023/0401160 | A1 | 12/2023 | Huggahalli et al. | |
| 2023/0418644 | A1 | 12/2023 | Tsirkin et al. | |
| 2024/0036735 | A1 * | 2/2024 | Wang | G06F 3/0611 |
| 2024/0086071 | A1 * | 3/2024 | Gorrle | G06F 3/0629 |
| 2024/0126450 | A1 | 4/2024 | Cheng | |
| 2025/0021483 | A1 * | 1/2025 | Hadley | G06F 12/0862 |
| 2025/0110863 | A1 * | 4/2025 | Abhishek Raja | G06F 12/023 |

* cited by examiner

500

| ID 505 | Address 510 | Length 515 | Secure Prefetch 520 | Next Seq. 525 |
|---|---|---|---|---|
| 0 | [x] | 16 KB | 0 | [x]+j |
| 1 | [y] | 0 KB | 1 | [y]+k |
| ... | ... | ... | ... | ... |

FIG. 5

SYSTEMS AND METHODS OF IN-MEMORY PREFETCH FOR WIDE-IO NAND MEMORY

CROSS-REFERENCE TO RELATED APPLICATIONS

This application claims the benefit of U.S. Provisional Patent Application Ser. No. 63/679,012, filed Aug. 2, 2024, which is incorporated by reference herein for all purposes.

TECHNICAL FIELD

The disclosure relates generally to memory systems, and more particularly to secure in-memory data prefetch for wide-IO NAND memory.

BACKGROUND

The present background section is intended to provide context only, and the disclosure of any concept in this section does not constitute an admission that said concept is prior art.

Artificial intelligence (AI) workloads demand memory and storage solutions that provide high throughput and low latency to accommodate rapid processing of relatively large datasets. High throughput memory/storage ensures data can be read and written quickly. Low latency memory/storage provides quick data access for real-time AI applications. However, the proliferation of AI has resulted in a rapid increase in demands for improvements in data movement bandwidths and data storage capacity, which has left data centers and related devices struggling to keep up with demand.

SUMMARY

In various embodiments, the systems and methods described herein include systems, methods, and apparatuses for secure in-memory data prefetch for wide-IO NAND memory. In some aspects, the techniques described herein relate to a method of secure prefetching in a memory device, the method including: allocating a memory region of a first memory type of the memory device based on an allocation command received from a host of the memory device; receiving, at a controller of the first memory type and from an application of the host, a load instruction configured for a second memory type different from the first memory type; converting a memory address, of the second memory type and included in the load instruction, from the second memory type to a converted memory address of the first memory type; determining the converted memory address matches a memory address of the memory region; fetching prefetch data from the memory region based on predicting that the application will use the data based on the load instruction; and providing the prefetch data to the application of the host based on the load instruction.

In some aspects, the techniques described herein relate to a method, further including storing, in a data protection table, allocation information that is included in the allocation command, the allocation information including at least one of a starting address of the memory region, a length of the memory region, a memory region identifier (ID), a secure prefetch indicator, or a next memory address based on the starting address plus an offset, the offset being based on a data access pattern of the application.

In some aspects, the techniques described herein relate to a method, wherein the data protection table is stored on the controller of the first memory type, the data protection table being managed by the host based on a command communicated via a control address space of the memory device.

In some aspects, the techniques described herein relate to a method, further including removing the allocation information from the data protection table based on receiving a free command, the free command indicating at least one of the starting address of the memory region, the length of the memory region, the secure prefetch indicator, or the memory region ID, the free command and the allocation command being received via a control address space of the host.

In some aspects, the techniques described herein relate to a method, wherein an address where the prefetch data is fetched is based on at least one of: the next memory address and a prefetch confidence value, or the converted memory address and the prefetch confidence value.

In some aspects, the techniques described herein relate to a method, wherein an address where the prefetch data is fetched is at the starting address of the memory region based on determining that an estimated location for the data being prefetched goes beyond a boundary of the memory region, the memory region including application data associated with the application.

In some aspects, the techniques described herein relate to a method, further including using a data transfer protocol of the second memory type to provide the prefetch data to the application of the host, wherein the data transfer protocol includes a dynamic random-access memory data transfer protocol.

In some aspects, the techniques described herein relate to a method, wherein: providing the prefetch data to the application is based on storing the prefetch data fetched from the memory region in a data buffer of the first memory type, the data buffer and the controller of the first memory type is managed by the host based on commands communicated via a control address space of the memory device, the prefetch data is provided to the application via the data address space of the host, and the load instruction is received via the data address space of the host.

In some aspects, the techniques described herein relate to a method, further including storing a data access pattern associated with the application in an access pattern table of the first memory type, wherein predicting that the application will use the prefetch data is based on the controller of the first memory type monitoring the application and detecting the data access pattern according to the monitoring.

In some aspects, the techniques described herein relate to a method, wherein: the first memory type includes NAND flash memory, and the second memory type includes dynamic random-access memory.

In some aspects, the techniques described herein relate to a device including: one or more processors; and memory storing instructions that, when executed by the one or more processors, cause the device to: allocate a memory region of a first memory type of the memory device based on an allocation command received from a host of the memory device; receive, at a controller of the first memory type and from an application of the host, a load instruction configured for a second memory type different from the first memory type; convert a memory address, of the second memory type and included in the load instruction, from the second memory type to a converted memory address of the first memory type; determine the converted memory address matches a memory address of the memory region; fetch prefetch data from the memory region based on predicting that the application will use the data based on the load instruction; and provide the prefetch data to the application of the host based on the load instruction.

In some aspects, the techniques described herein relate to a device, wherein the instructions, when executed by the one or more processors, further cause the device to store, in a data protection table, allocation information that is included in the allocation command, the allocation information including at least one of a starting address of the memory region, a length of the memory region, a memory region identifier (ID), a secure prefetch indicator, or a next memory address based on the starting address plus an offset, the offset being based on a data access pattern of the application.

In some aspects, the techniques described herein relate to a device, wherein the data protection table is stored on the controller of the first memory type, the data protection table being managed by the host based on a command communicated via a control address space of the memory device.

In some aspects, the techniques described herein relate to a device, wherein the instructions, when executed by the one or more processors, further cause the device to, further including removing the allocation information from the data protection table based on receiving a free command, the free command indicating at least one of the starting address of the memory region, the length of the memory region, the secure prefetch indicator, or the memory region ID, the free command and the allocation command being received via a control address space of the host.

In some aspects, the techniques described herein relate to a device, wherein an address where the prefetch data is fetched is based on at least one of: the next memory address and a prefetch confidence value, or the converted memory address and the prefetch confidence value.

In some aspects, the techniques described herein relate to a device, wherein an address where the prefetch data is fetched is at the starting address of the memory region based on determining that an estimated location for the data being prefetched goes beyond a boundary of the memory region, the memory region including application data associated with the application.

In some aspects, the techniques described herein relate to a device, wherein the instructions, when executed by the one or more processors, further cause the device to use a data transfer protocol of the second memory type to provide the prefetch data to the application of the host, wherein the data transfer protocol includes a dynamic random-access memory data transfer protocol.

In some aspects, the techniques described herein relate to a non-transitory computer-readable medium storing code that includes instructions executable by a processor to: allocate a memory region of a first memory type of a memory device based on an allocation command received from a host of the memory device; receive, at a controller of the first memory type and from an application of the host, a load instruction configured for a second memory type different from the first memory type; convert a memory address, of the second memory type and included in the load instruction, from the second memory type to a converted memory address of the first memory type; determine the converted memory address matches a memory address of the memory region; fetch prefetch data from the memory region based on predicting that the application will use the data based on the load instruction; and provide the prefetch data to the application of the host based on the load instruction.

In some aspects, the techniques described herein relate to a non-transitory computer-readable medium, wherein the code includes further instructions executable by the processor to store, in a data protection table, allocation information that is included in the allocation command, the allocation information including at least one of a starting address of the memory region, a length of the memory region, a memory region identifier (ID), a secure prefetch indicator, or a next memory address based on the starting address plus an offset, the offset being based on a data access pattern of the application.

In some aspects, the techniques described herein relate to a non-transitory computer-readable medium, wherein the data protection table is stored on the controller of the first memory type, the data protection table being managed by the host based on a command communicated via a control address space of the memory device.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The techniques of secure in-memory prefetch for wide-IO NAND memory described herein include multiple advantages and benefits. For example, the systems and methods described provide optimal prefetch hit ratios. Also, the systems and methods described increase memory security based on memory region IDs (e.g., protection domain identifiers). The systems and methods described provide increased bandwidth based on the secure prefetch operations, reducing unintentional reads outside of an intended memory region. The systems and methods described reduce NAND workload based on the reduction in unintentional reads, thus reducing NAND latency. Also, based on the systems and methods described, the prefetcher read efficiency is improved by configuring prefetching to read within a start address and/or an end address of an allocation. For example, the systems and methods may include preventing a prefetcher from reading beyond the start address and/or the end address. In some cases, the prefetcher read efficiency may be improved based on wrapping around to the start address after reaching the end address (e.g., linking the end address to the start address). For example, the systems and methods may include configuring the end address to point back to the start address of the allocation, looping the end address back to the start address.

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 5 illustrates an example data structure in accordance with one or more implementations as described herein.

Figure 1:
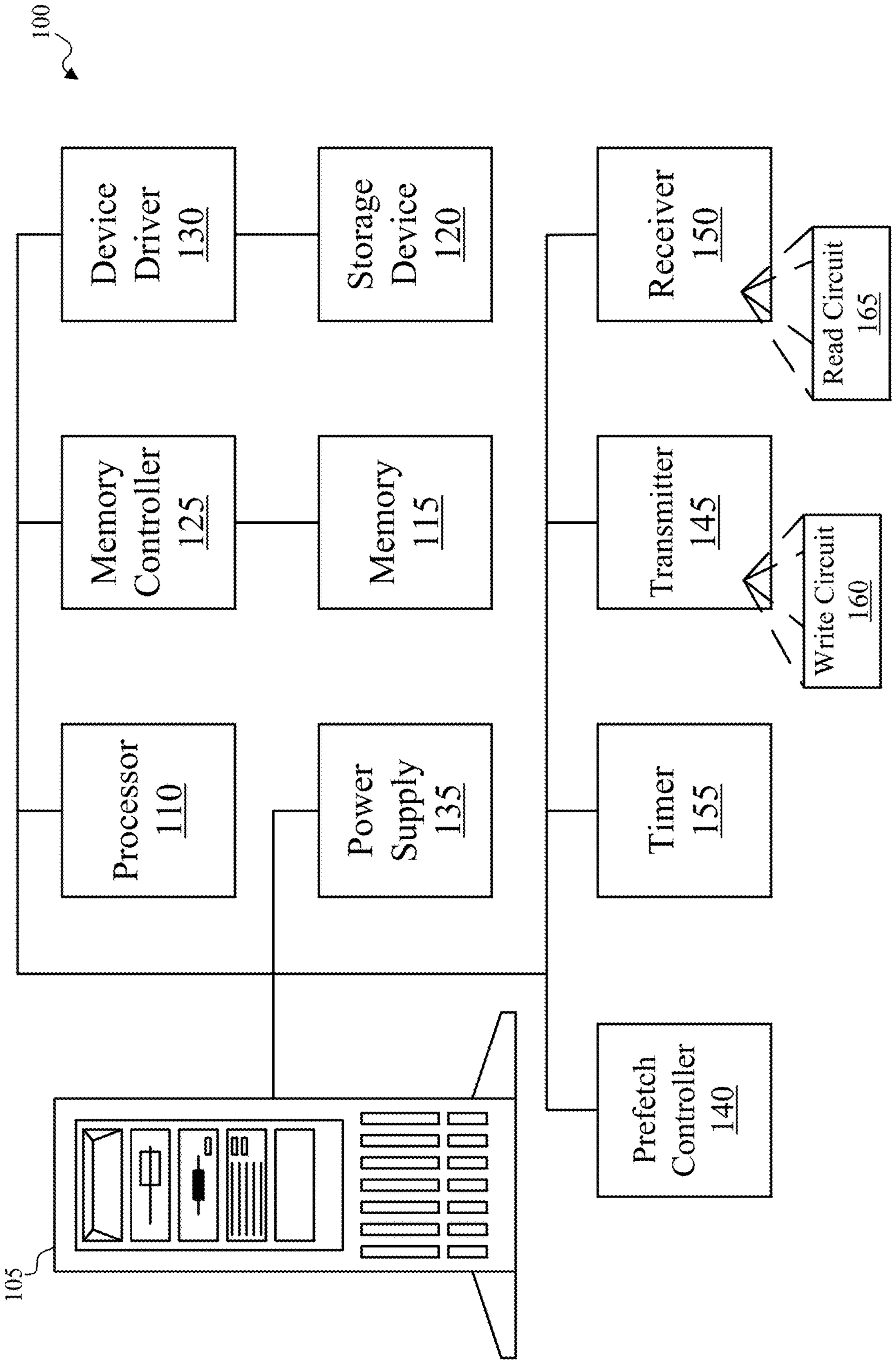
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of a hardware embodiment, a computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, a hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Data processing may include data buffering, aligning incoming data from multiple communication lanes, forward error correction (FEC), etc. For example, data may be received by an analog front end (AFE), which can prepare the incoming data for digital processing. The digital portion of the transceivers (e.g., digital signal processor (DSP)) may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, SoC, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

The systems and methods described herein may be based on and/or may include artificial intelligence (AI). AI can include the concept of creating intelligent machines that can sense, reason, act, and adapt. Machine learning (ML) may be a subset of AI that helps build AI-driven applications. AI programs can include Large Language Models (LLMs). LLMs can use a relatively large amount of memory. The systems and methods described herein may provide additional memory resources and increased memory bandwidth for processes such as LLM processes.

The systems and methods described herein may be based on and/or may include wide input/output (IO) memory. Wide IO memory can include a memory interface for stacked integrated circuits, including stacked memory (e.g., 3D memory). Wide IO memory can include a low-power, high-bandwidth memory (e.g., flash memory, NAND memory, DRAM) that uses 3D stacking with Through Silicon Via (TSV) interconnects to stack memory chips directly on a base die or System on a Chip (SoC). Wide IO memory may be configured for applications with relatively high memory bandwidth. Wide IO memory can reduce IO power consumption due to its low-capacitance TSVs. In some cases, the systems and methods may include mobile devices with wide-IO NAND for running LLM AI applications. Wide-IO NAND may be used as a rank-based memory extension. The systems and methods described may implement DRAM transfer protocols. DRAM transfer protocols may define the timing and signals for transferring data and control information to and from DRAM devices (e.g., between Wide IO memory and DRAM).

The systems and methods described herein may be based on and/or may include High Bandwidth Memory (HBM). HBM can include a type of memory architecture used in high-performance computing applications that requires fast data transfer speeds. HBM uses 3D stacking technology to pack more memory chips into a smaller space, which reduces the distance data needs to travel between the processor and memory. This results in higher bandwidth, which allows for faster data transfer, and lower power consumption, which can help extend battery life.

The systems and methods described herein may be based on and/or may include High Bandwidth NAND (HBN). HBN can include a type of memory (e.g., non-volatile memory, read-only memory (ROM)) that can read and program by plane instead of line. In some cases, HBN may be based on a bumpless TSV configuration. In some cases, HBN may be used for ROM while High Bandwidth Memory (HBM) may be used for RAM. HBN may include a type of memory chip with low power consumption and wide communication lanes. In some cases, high bandwidth NAND may be referred to as High Bandwidth Flash. NAND memory can be a type of flash memory. NAND flash memory may be used in smartphones, tablets, computers, televisions, etc. NAND flash memory may be used in USB flash drives, SD cards, and solid-state drives (SSDs).

Some systems may implement wide-IO NAND with "high latency." While Wide-IO technology generally offers high bandwidth due to multiple parallel data channels, NAND flash memory can still experience relatively high latency when accessing individual data blocks. Thus, wide-IO NAND can take a noticeable amount of time to read or write data compared to other memory types like DRAM. Some systems may implement Wide-IO NAND with "low security," a type of NAND flash memory that utilizes the Wide-IO interface standard, but lacks robust security features, meaning data stored on Wide-IO NAND low security can be relatively easily accessed or compromised compared to NAND with more advanced security mechanisms.

The systems and methods described herein may be based on and/or may include memory access patterns of applications. The memory access pattern of an application (e.g., AI applications), for example, may refer to the way in which a program reads and writes data from memory, which may be characterized by patterns of sequential, random, and/or localized access, which can impact the overall performance of a given system. Different network designs (e.g., convolutional neural networks, recurrent neural networks) may have distinct data access patterns depending on how information is processed through the network layers. Sequential access patterns may occur when data is accessed in a linear order, such as iterating through elements of a large array, which can be efficient for processing large datasets in a predictable manner. Localized access patterns may include repeatedly accessing data within a small region of memory, which can be beneficial for caching as the frequently used data stays readily available. Prefetching techniques can predict future memory accesses and proactively load data that is predicted to be used into cache to reduce the latency associated with the expected memory operations. The systems and methods described herein may implement prefetching techniques based on memory access patterns.

The systems and methods described herein may be based on and/or may include Host Assisted Memory Device Prefetch. In some cases, a memory-side prefetcher may use a prefetching configuration to predict what data to prefetch into memory (e.g., into faster memory), which allows for higher performance. Prefetching can include predicting data most likely to be called by a processor, retrieving the data, and storing the prefetched data in a buffer memory (e.g., cache) before the processor calls for the data. An application may perform a prefetch within its data processing pipeline, at the point where the application anticipates needing specific data in the near future. Prefetching may be based on the application or a process associated with the application analyzing patterns in the data access sequence and proactively loading anticipated data into cache memory before the data is requested. In some examples, prefetch hardware (e.g., in-memory prefetcher on memory controller, NAND controller) may observe access patterns (e.g., load/store access patterns) and may prefetch data based on the observed access behavior.

The systems and methods described herein may be based on and/or may include a prefetch distance. The prefetch distance may indicate how far ahead the prefetch memory is than the memory being used by a processor. If the prefetch distance is too far ahead, the values may sit in cache for too long and may get evicted. If the prefetch distance is too near the data being used by the processor (e.g., not far enough ahead), the program may be ready for the values before they have arrived.

The systems and methods described herein may be based on and/or may include a confidence value. Prefetch confidence may include a value used to balance prefetch coverage for accuracy. Prefetch confidence may be based on a number of factors, which may include prefetch history, prefetch accuracy, prefetch depth, etc. The confidence value may be used to dynamically throttle the depth of prefetching. For example, the a prefetcher may use the confidence value to adjust the length of a prefetch. Thus, prefetch length confidence may include a metric that indicates the degree of certainty a system has about the accuracy of a predicted future memory access pattern. Prefetch length confidence may indicate how far ahead to prefetch data based on that prediction. A higher confidence value may result in the system prefetching a larger sequence of data because the pattern is determined to be reliable. A lower confidence value may result in the system prefetching a smaller amount of data to avoid unnecessary fetches if the prediction is inaccurate.

Some systems can cause issues with direct access to wide-IO NAND memory. For example, fragmentation of host virtual to physical address mapping can cause (e.g., inherently cause) incorrect prefetch predictions. In some cases, fragmented virtual address to physical address mapping can cause prefetch to be inefficient in heading data and/or tailing data.

Some systems can delay memory operations associated with wide-IO NAND. In some cases, a processor (e.g., host CPU) can increase latency in these memory operations (e.g., based on CPU polling). CPU cycles may be spent on polling before executing load/store instructions, which can result in a 10-30 microsecond delay (e.g., CPU stall) in application execution. With some systems, application prefetch may rely on engineer coding for every application. With such systems, CPU cache prefetch may not be optimized for Wide-IO NAND page size, relatively high latency, and relatively low security.

Based on the systems and methods described herein, a prefetch (e.g., in-memory prefetch, in-device prefetch) may be set to some location within a given memory region. For example, the prefetch may be at a location within a region of memory allocated to an application and associated with a memory region ID. When the prefetch reaches a first boundary of the given memory region, the prefetch may wrap around to a second boundary. For example, when the prefetch reaches the end of the memory region, the prefetch may wrap around to the start of the memory region. Thus, the systems and methods protect against unintentional prefetch reads outside a memory region associated with a prefetch operation.

The systems and methods described herein avoid or reduce the latency caused by polling. Also, the systems and methods described herein improve the accuracy and efficiency of prefetch predictions. In some cases, the systems and methods may include notifications regarding Out-of-Band Memory operations (e.g., allocation, deallocation, data swap) associated with registering allocations to an allocation table. In some cases, the systems and methods described can include prefetching that wraps the end of allocated space around to the beginning of allocated space. Based on the systems and methods described, efficiency of prefetching may be improved upon the first data operation (e.g., upon the first read).

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for case of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe®) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe®) interface, or a Compute Express Link (CXL®) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to write data into storage, such as a register, in memory 115 and/or storage device 120. In a similar manner, receiver 150 may include read circuit 165, which may be used to read data from storage, such as a register, from memory 115 and/or storage device 120. In the illustrated example, machine 105 may include timer 155, which may be used to time one or more operations, indicate a time period, indicate a lapse of time, indicate an expiration, indicate a timeout, etc.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced extensible Interface (AXI) and/or the like, or any combination thereof, Transmission Control Protocol/Internet Protocol (TCP/IP), FibreChannel, InfiniBand, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, prefetch controller 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of prefetch controller 140 may be implemented as an SoC.

In one or more examples, prefetch controller 140 may provide secure in-memory data prefetch for wide-IO NAND memory based on the systems and methods described herein. In some examples, prefetch controller 140 may include any one of, or combination of, logic (e.g., logical circuit), hardware (e.g., processing unit, memory, storage), software, firmware, and the like. Prefetch controller 140 may include or operate in conjunction with at least one of a memory controller (e.g., NAND memory controller, wide-IO NAND controller), a prefetcher (e.g., in-memory prefetcher), an access pattern table (e.g., access history FIFO table), a protection domain table, or a data buffer. In some cases, prefetch controller 140 may perform one or more functions in conjunction with processor 110. In some cases, at least a portion of prefetch controller 140 may be implemented in or by processor 110 and/or memory 115. The one or more logic circuits of prefetch controller 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable prefetch controller 140 to provide secure in-memory data prefetch for wide-IO NAND memory.

Figure 2:
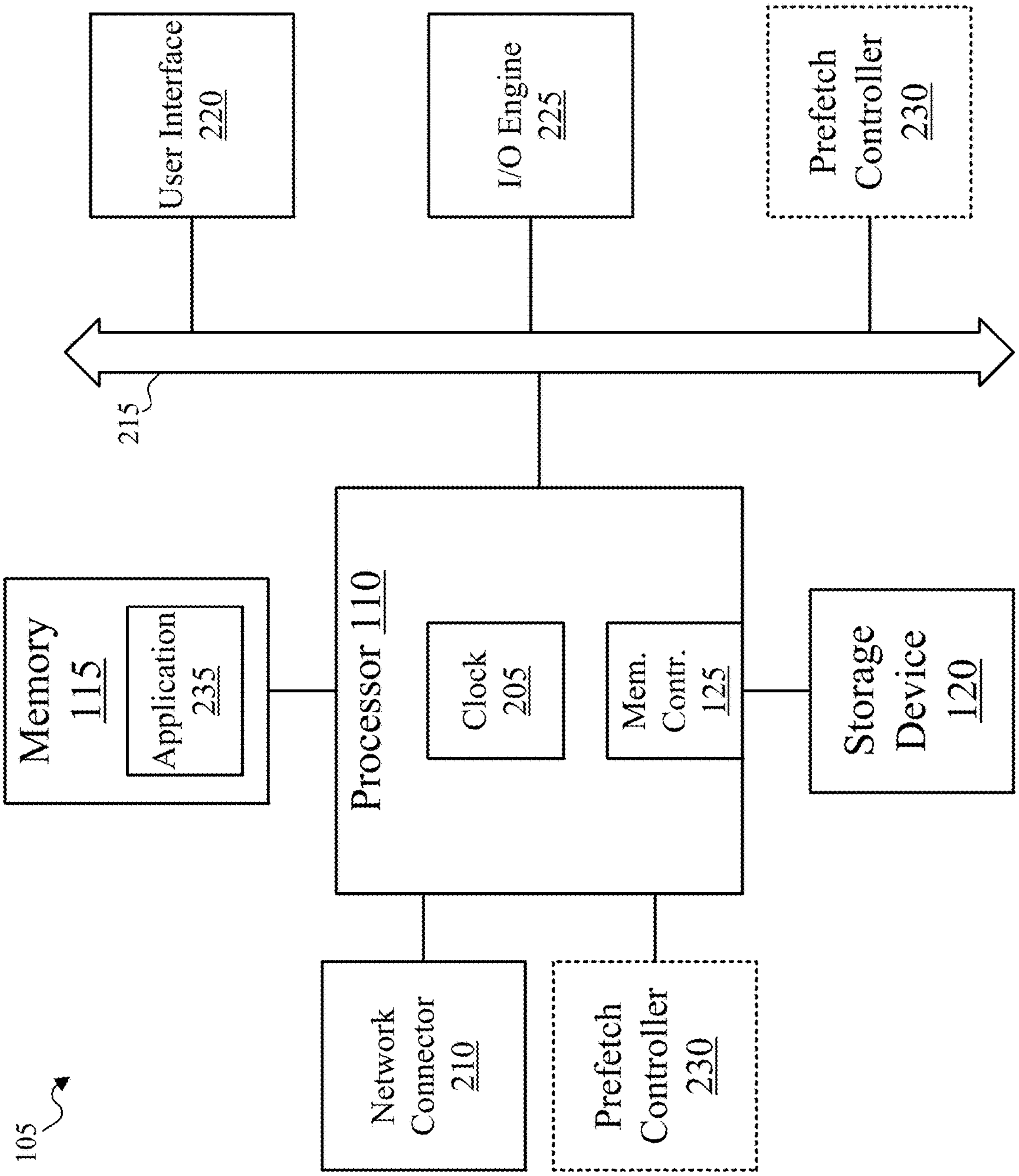
FIG. 2 illustrates details of the system of FIG. 1, according to one or more implementations as described herein.

FIG. 2 illustrates details of machine 105 of FIG. 1, according to examples described herein. In the illustrated example, machine 105 may include processor 110. Processor 110 may include one or more processors and/or one or more dies. Processor 110 may include memory controller 125 (e.g., one or more memory controllers) and clock 205 (e.g. one or more clocks), which may be used to coordinate the operations of the components of the machine. Processor 110 may be coupled to memory 115 (e.g., one or more memory chips, stacked memory, etc.), which may include random access memory (RAM), read-only memory (ROM), or other state preserving media, as examples. Processor 110 may be coupled to storage device 120 (e.g., one or more storage devices), and to network connector 210, which may be, for example, an Ethernet connector or a wireless connector. Processor 110 may be connected to bus 215 (e.g., one or more buses), to which may be attached user interface 220 (e.g., one or more user interfaces) and Input/Output (I/O) interface ports that may be managed using I/O engine 225 (e.g., one or more I/O engines), among other components. As shown, processor 110 may be coupled to prefetch controller 230, which may be an example of prefetch controller 140 of FIG. 1. Additionally, or alternatively, processor 110 may be connected to bus 215, and prefetch controller 230 may be attached to bus 215. As shown, memory 115 may include one or more applications (e.g., application 235). For example, one or more applications, including application 235, may be loaded on memory 115. In some cases, a host (e.g., machine 105) may assign an allocation of memory 115 to application 235. In some cases, memory 115 may be configured as a ranked memory device (e.g., a rank of DRAM, a rank of NAND, etc.).

The systems and methods described herein (e.g., machine 105) may be based on and/or may include Compute Express Link (CXL) memory. CXL memory can include memory with a high-speed interface that allows for communication between devices such as processors, memory, accelerators, storage, and other IO devices. CXL memory can be designed for high-performance data center computers and may use a Peripheral Component Interconnect Express (PCIe) physical and/or electrical interface. The systems and methods described herein may be based on and/or may include Low-Power Double Data Rate (LPDDR). LPDDR can include a type of synchronous DRAM that may be used in high-bandwidth data transfers while still being energy efficient.

The systems and methods described herein may be based on and/or may include virtual address to physical address mapping, also known as memory translation. Memory translation can include a process of finding the physical memory address that matches a virtual address when a workload accesses data in memory. This mapping process may be performed in hardware using information from a kernel, which can be faster than software. In some cases, a host may use virtual addresses, also known as logical addresses, to manage and access memory.

A virtual address space may include a set of ranges of virtual addresses that a host (e.g., operating system) makes available to a process. For example, a host may instruct a CPU to generate a virtual address for a program (e.g., while the program is running). This address space may be considered virtual or logical because the address space does not exist physically. The host may use the virtual address to access a physical address of a storage device, which is the physical location of data in memory, such as RAM. In some cases, a Memory Management Unit (MMU) may map the virtual address to the physical address (e.g., before the virtual address is used). This mapping allows a program to act as if it has exclusive use of the main memory, even when other processes are also running on other virtual address spaces.

The systems and methods described herein may be based on and/or may include logical block addressing (LBA). LBA may be used to identify blocks of data on a storage device (e.g., SSD). LBA can include an addressing scheme that uses an integer index to locate blocks, with the first block being LBA 0, the second LBA 1, and so on. The systems and methods described herein may be based on and/or may include logical to physical (L2P) mapping. L2P mapping can include a table (e.g., L2P mapping table) that tracks the assignments of LBAs to physical block addresses (PPNs) in storage device (e.g., NAND flash SSDs. The L2P table may be stored in system data of an SSD and may be updated whenever a write operation occurs on an LBA.

The systems and methods described herein may be based on and/or may include out-of-band operations and/or operations based on out-of-band data, etc. In computer networking, out-of-band (OOB) data can include a separate stream of data that is independent from a main data stream. OOB data may be received by connection-oriented (e.g., stream) sockets regardless of the position of the data in the stream, or the order in which the data is sent. OOB data can be delivered to a socket independently of a main receive queue or default data receive queue.

Figure 3:
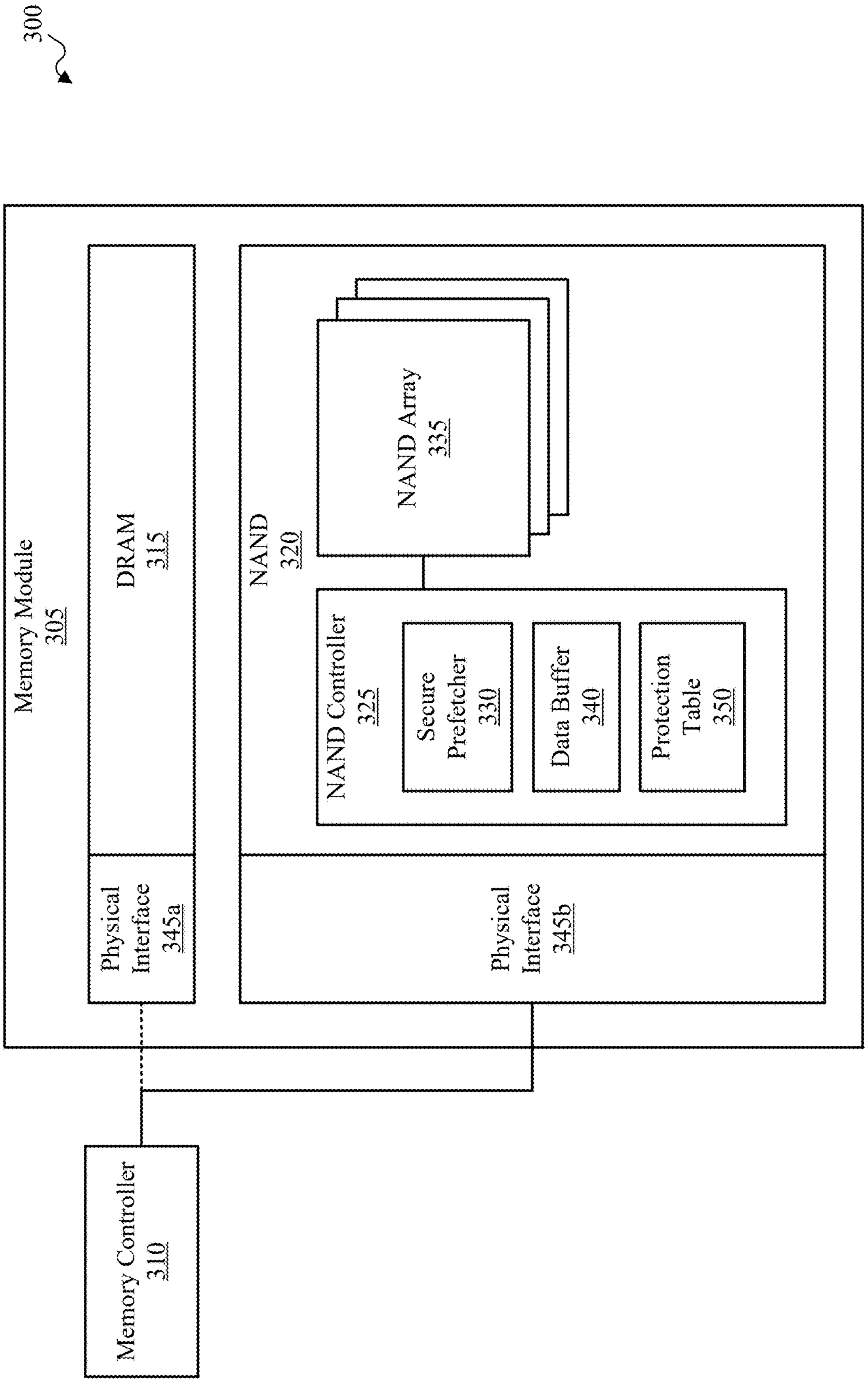
FIG. 3 illustrates an example system in accordance with one or more implementations as described herein.

FIG. 3 illustrates an example system 300 in accordance with one or more implementations as described herein. In some configurations, one or more aspects of system 300 may be implemented by or in conjunction with prefetch controller 140 of FIG. 1 and/or prefetch controller 230 of FIG. 2. In some configurations, one or more aspects of system 300 may be implemented by or in conjunction with machine 105, components of machine 105, or any combination thereof.

In the illustrated example, system 300 may include memory module 305 (e.g., a memory device) and memory controller 310. In some cases, memory module 305 may be an example or component of memory 115 of FIGS. 1 and 2. Memory controller 310 may be an example of memory controller 125 of FIGS. 1 and 2. As shown, memory module 305 may be a dual-rank memory module. Thus, memory module 305 may include DRAM 315 (e.g., a DRAM rank) and NAND 320 (e.g., a NAND rank). As shown, DRAM 315 may include physical interface 345*a*. In some cases, DRAM 315 may be a first ranked memory (e.g., rank 0) of memory module 305, and NAND 320 may be a second ranked memory (e.g., rank 1) of memory module 305. As shown, NAND 320 may include NAND controller 325, NAND array 335 (e.g., array of NAND memory cells; and one or more NAND flash memory dies), and physical interface 345*b*. In some cases, NAND array 335 may include a wide-IO NAND memory array. In alternative embodiments (not shown), a dual ranked memory module such as 305 may instead comprise two ranks of NAND 320, and no ranks of DRAM 315. In other alternative embodiments (not shown), the memory module 305 may be a single-ranked memory module, and may comprise a single rank of NAND 320, and no ranks of DRAM 315. In some cases, DRAM 315 includes a first physical interface (e.g., physical interface 345*a*) and NAND 320 includes a second physical interface different from the first physical interface (e.g., physical interface 345*b*). Alternatively, system 300 may include a physical interface that is shared between DRAM 315 and NAND 320 (e.g., physical interface 345*a* and physical interface 345*b*).

In some cases, NAND 320 may communicate via physical interface 345*b*. For example, NAND 320 may receive a write command, receive a read command, provide data, receive data, etc., via physical interface 345*b*. In some cases, physical interface 345*a* and/or physical interface 345*b* may include a DRAM physical interface. In some examples, when NAND 320 uses physical interface 345*b*, NAND 320 may be configured to follow one or more electrical and/or timing constraints used by a DRAM.

As shown, NAND controller 325 may include secure prefetcher 330 (e.g., in-memory prefetcher), data buffer 340, and/or protection table 350. In some examples, secure prefetcher 330 may perform prefetching operations. In some cases, secure prefetcher 330 may provide secure in-memory data prefetch for wide-IO NAND memory. In some cases, a host of memory module 305 and memory controller 310 may allocate a memory space configured for use as main memory (e.g., system memory ordinarily comprising DRAM), which may be allocated for an application or for an application's use. In some examples, the host may view the entirety of memory module 305 as a DRAM memory module. Thus, the host may treat NAND 320 as DRAM memory (e.g., like DRAM 315). Additionally, or alternatively, the host may may allocate a memory space in NAND 320 for the application. Secure prefetcher 330 may perform prefetch operations for the application based on the host providing a load instruction of the application to NAND controller 325. In some cases, the load instruction may be configured for a DRAM (e.g., DRAM 315). Accordingly, NAND controller 325 may convert the load instruction to a NAND-based load instruction (e.g., convert a DRAM address to a NAND address). Secure prefetcher 330 may prefetch data for the application based on the load instruction. In some cases, secure prefetcher 330 may prefetch data based on a pattern sequence that NAND controller 325 learns based on monitoring the application. Logically, the host may treat or interact with memory module 305 (e.g., the entirety of memory module 305) as a main memory (e.g., traditional DRAM-based main memory), allocating memory as requested by applications and/or an operating system associated with the host. Physically, the host may be expecting memory module 305 (e.g., the entirety of memory module 305) to act as a DRAM. For example, the host may be expecting memory module 305 to function according to DRAM timing parameters and/or DRAM electrical parameters. The prefetch operations described herein (e.g., prefetch operations of secure prefetcher 330) may assist in helping memory module 305 to meet the physical DRAM timing constraints by ensuring that the prefetched data is present in data buffer 340 (e.g., based on NAND being slower than DRAM).

In some examples, data buffer 340 may be associated with a NAND (e.g., wide-IO NAND system, NAND 320, NAND controller 325, etc.). In some examples, data buffer 340 may be at least partially implemented in SRAM and/or DRAM. Data buffer 340 may be implemented in NAND 320 (e.g., within the wide IO NAND system of NAND 320). As shown, data buffer 340 may be at least partially implemented in NAND controller 325. For example, a memory in NAND controller 325 (e.g., SRAM on NAND controller 325) may include data buffer 340 and/or protection table 350.

Based on the systems and methods described, a host may notify NAND controller 325 regarding an allocation. Protection table 350 of NAND controller 325 may include an allocation table that registers memory allocations to NAND array 335 (e.g., allocation table for memory allocation/free operations associated with NAND 320). The host may send memory allocation commands and/or free commands to NAND controller 325 for protection table 350. In some cases, the allocation commands and/or free commands may be communicated via a control address space of the host (e.g., via control address write).

Secure prefetcher 330 may be configured to read heading data in a start address of an allocation (e.g., allocated memory region of NAND 320) based on the allocation table. In some cases, secure prefetcher 330 may read the heading data before pattern detection (e.g., pattern detection detected by NAND controller 325 monitoring memory operations of an application). Secure prefetcher 330 may continue to read heading data in a start address after reaching the end address of a given allocation. Secure prefetcher 330 may continue to read heading data in the start address based on the allocation table. In some cases, secure prefetcher 330 may prevent read operations beyond the end address of an allocation, In some cases, the allocation table may link the end of allocation to the start address (e.g., loop the end of an allocation back to the starting address of the allocation). The systems and methods may include a host sending data move and/or data swap operations via a control address space of the host (e.g., via control address write). In some cases, the host may send data move and/or data swap operations to NAND 320. The systems and methods may include a NAND controller 325 remapping a physical block address for data move and/or data swap operations.

Figure 4:
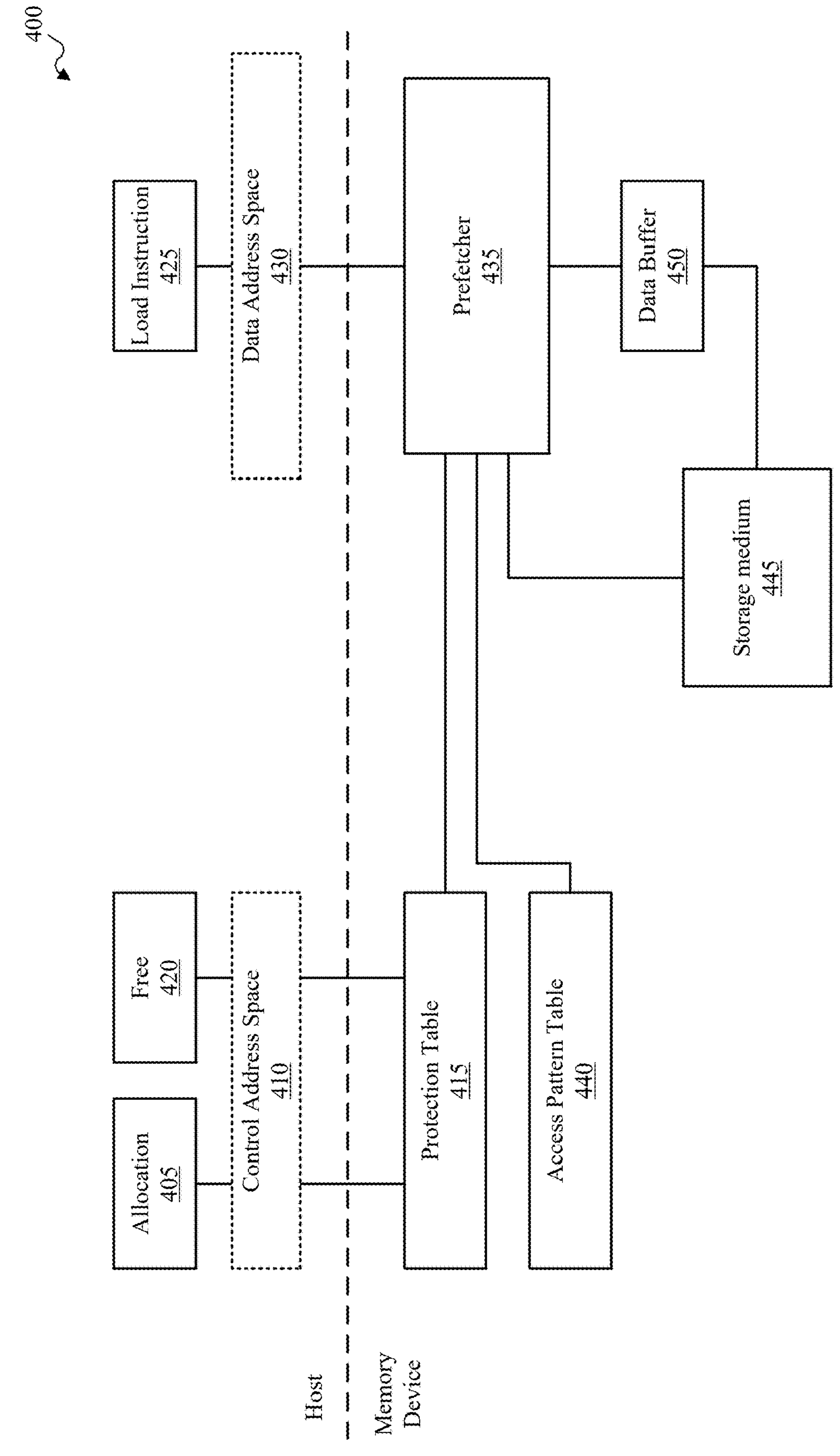
FIG. 4 illustrates an example system flow in accordance with one or more implementations as described herein.

FIG. 4 illustrates an example system flow 400 in accordance with one or more implementations as described herein. In some configurations, one or more aspects of system flow 400 may be implemented by or in conjunction with prefetch controller 140 of FIG. 1 and/or prefetch controller 230 of FIG. 2. In some configurations, one or more aspects of system flow 400 may be implemented by or in conjunction with machine 105, components of machine 105, or any combination thereof. As shown, aspects of system flow 400 may be based on a host and a memory device (e.g., wide-IO NAND). In some cases, the host may be an example of machine 105. The memory device may be an example or component of memory 115 of FIG. 1 or FIG. 2, and/or an example or component of NAND 320 of FIG. 3.

At 405, the host may allocate a memory region in the memory device based on sending an allocation command to the memory device. In some cases, the host may assign the memory allocation to a program or application of the host. The allocation command may include at least one of a starting address (e.g., starting address of allocation in wide-IO NAND memory; starting address of allocation in NAND 320); a length value (e.g., allocation length; size of the allocation with respect to the starting address); and/or an allocation identifier (e.g., allocation ID, memory region identifier ID). In some cases, the allocation identifier may be a value unique to the allocation. The allocation ID may identify the memory region of the allocation that is defined by the starting address and length of the allocation. The allocation ID may protect data in the memory device (e.g., data located in the allocation). In some cases, the allocation ID may protect against unauthorized allocation and/or unauthorized access to the data in a given allocation. For example, a malicious process that attempts to execute a command to access an address may fail when protection table 415 indicates that the address is not associated with an allocation ID that is registered in protection table 415.

The host may issue the allocation command via a control address space of the host (e.g., control address space 410). In some cases, the allocation command may be a control address command. Control address space 410 may include to a portion of a memory address space (e.g., portion of the host's address space) that is dedicated to managing system control functions. Control address space 410 may be used by the host or operating system to store control data related to system operations and device management, allowing direct access to hardware components and control signals without going through the user address space (e.g., bypassing a user address space; bypassing data address space 430). The host may initiate and/or manage control address space 410. In some cases, the host may map control address space 410 to the memory device. Accordingly, a control address space of the memory device may be based on the control address space of the host (e.g., control address space 410).

In some examples, allocation information (e.g., starting address, length, allocation ID) may be stored in protection table 415. In some cases, the allocation information may be stored in protection table 415 based on or in response to the allocation command. In some cases, the memory device (e.g., a controller of the memory device; NAND controller 325) may store the allocation information in protection table 415. Protection table 415 may include one or more entries (e.g., first allocation information of a first allocation command, second allocation information of a second allocation command, etc.). In some cases, protection table 415 may provide a memory region (e.g., starting address, length, allocation ID of a given allocation) to prefetcher 435 based on the memory device receiving the allocation command. A query of protection table 415 may indicate an allocation ID of the memory region, a starting address of the memory region, a length of the memory region, a secure prefetch indicator, and/or a next memory address.

At 420, the host may free an entry in protection table 415 based on a free command (e.g., deallocation command). The host may issue the free command via control address space 410 of the host (e.g., the free command is a control address command). In some examples, the host may free or deallocate (a) one or more entries in protection table 415 and/or (b) free or deallocate a memory region in the memory device based on a free command. In some cases, the memory device (e.g., a controller of the memory device; NAND controller 325) may free or remove allocation information stored in protection table 415 based on receiving the free command from the host. In some cases, the free command may include an allocation ID, and the memory device may (a) deallocate an allocated memory region associated with the allocation ID; and (b) free allocation information stored in an entry of protection table 415 based on the allocation information including the allocation ID. Accordingly, the free command may indicate an allocation ID of a memory region.

At 425, the host (e.g., an application of the host) may issue a load instruction to the memory device. In some cases, the load instruction may include a DRAM-based load instruction (e.g., DRAM read command). In some cases, the memory device (e.g., a controller of the memory device; NAND controller 325) may translate or convert the DRAM-based load instruction into a NAND-based load instruction. For example, the memory device may convert a DRAM address of the load instruction to a NAND address. Additionally, or alternatively, the memory device may convert a DRAM-based length to a NAND-based length.

In some cases, the load instruction may be provided via a data address space of the host (e.g., data address space 430). The data address space (e.g., different from control address space 410) may refer to a range of memory addresses (e.g., a portion of host address space) allocated for storing data within a given system. Data address space 430 may include memory space where a program (e.g., the application that issued the load instruction at 425) can access and manipulate its data. In some cases, the host may manage data address space 430. In some cases, the memory region of the allocation at 405 may be in data address space 430. The host may initiate and/or manage data address space 430. In some cases, the host may map data address space 430 to the memory device. Accordingly, a data address space of the memory device may be based on the data address space of the host (e.g., data address space 430).

Prefetcher 435 may perform a prefetch operation based on the NAND-based load instruction. In some cases, prefetcher 435 may perform a prefetch operation based on a memory access pattern and/or update a memory access pattern based on a pattern update received from access pattern table 440. In some examples, access pattern table 440 may store one or more access patterns of one or more applications and/or provide an updated memory access pattern to prefetcher 435. In some cases, prefetcher 435 may use an updated memory access pattern in performing a prefetch operation (e.g., based on a most recent detected pattern).

In some cases, access pattern table 440 may store and/or keep track of memory access patterns. For example, the memory device (e.g., a controller of the memory device; NAND controller 325) may monitor memory access patterns, detect a memory access pattern, and save the detected memory access pattern in access pattern table 440. In some cases, the memory device may detect a change in a memory access pattern and update an existing pattern in access pattern table 440. When access pattern table 440 runs out of space, the memory device may remove one or more memory access patterns stored in access pattern table 440. In some cases, access pattern table 440 may be configured as a least-recently used table. Additionally, or alternatively, access pattern table 440 may be configured as a first in first out (FIFO) table. Thus, when access pattern table 440 runs out of space, the memory device may remove a first stored memory access pattern (e.g., access pattern table may pop an oldest stored memory access pattern) from access pattern table 440 based on the memory device adding a new data access pattern to access pattern table 440.

In some cases, prefetcher 435 may request data (e.g., prefetch data) based on a read command from an application (e.g., load instruction at 425). For example, prefetcher 435 may read data from a memory region that is specified by protection table 415 and that is associated with the load instruction. Prefetcher 435 may perform a prefetch request based on a memory access pattern and request prefetch data from a of the memory device (e.g., storage medium 445; wide-IO NAND storage medium). Storage medium 445 may provide the requested prefetch data to a data buffer of the memory device (e.g., data buffer 340, data buffer 450).

In some cases, data buffer 450 may provide the prefetch data to prefetcher 435. Prefetcher 435 may provide the prefetch data to the application of the host that issued the load instruction at 425. In some cases, the memory device may indicate to the host (e.g., to the application of the host) that the prefetch data is ready in data buffer 450. For example, the memory device may write to a register to indicate the prefetch data is ready (e.g., binary 1 indicates the prefetch data is ready, binary 0 indicates the prefetch data is not ready, or vice versa). In some examples, prefetcher 435 may transfer the prefetch data to the application via a DRAM data interface (e.g., physical interface 345, DRAM data transfer). Prefetcher 435 may provide the prefetch data to the application via data address space 430.

FIG. 5 illustrates an example data structure 500 in accordance with one or more implementations as described herein. In some configurations, one or more aspects of data structure 500 may be implemented by or in conjunction with prefetch controller 140 of FIG. 1 and/or prefetch controller 230 of FIG. 2. In some configurations, one or more aspects of data structure 500 may be implemented by or in conjunction with machine 105, components of machine 105, or any combination thereof.

In some examples, data structure 500 may depict a protection table (e.g., protection table 415). As shown, data structure 500 may include a series of rows having attributes stored in columns. In the illustrated example, data structure 500 may include one or more entries under a first column (e.g., ID 505), one or more entries under a second column (e.g., address 510), one or more entries under a third column (e.g., length 515), one or more entries under a fourth column (e.g., secure prefetch 520), and/or one or more entries under a fifth column (e.g., next sequence 525). In some cases, an entry under ID 505 may indicate an allocation ID (e.g., 0, 1, etc.) of a given memory region allocated to a memory device (e.g., NAND 320). An allocation ID may include one or more digits (e.g., one or more decimal digits, one or more binary digits, etc.). An entry under address 510 may indicate a starting address (e.g., [x], [y]) of a given memory region allocated to a memory device. A starting address may include a sequence of numbers in bytes that is represented in hexadecimal format (base 16).

An entry under length 515 may indicate the length of a given memory region allocated to a memory device. An entry under length 515 may be indicated in bits, bytes, etc. (e.g., 16 KB, 0 KB, etc.). An entry under secure prefetch 520 may indicate whether a secure prefetch flag is set (e.g., binary 1 indicates to use secure prefetch; binary 0 indicates secure prefetch is not enabled for that entry; or vice versa). When the secure prefetch flag is set for a given entry of a protection table, then a prefetch associated with that entry may be performed according to the secure prefetch systems and methods described herein.

An entry under next sequence 525 may indicate a next memory location of a given memory region allocated to a memory device. An entry under next sequence 525 may be based on the starting address plus an offset (e.g., [x]+j, [y]+k) the offset being based on a data access pattern of a given application (e.g., pattern sequence detected by a memory device). A given offset (e.g., j, k) may be represented in bits, bytes, hexadecimal, etc.

Figure 6:
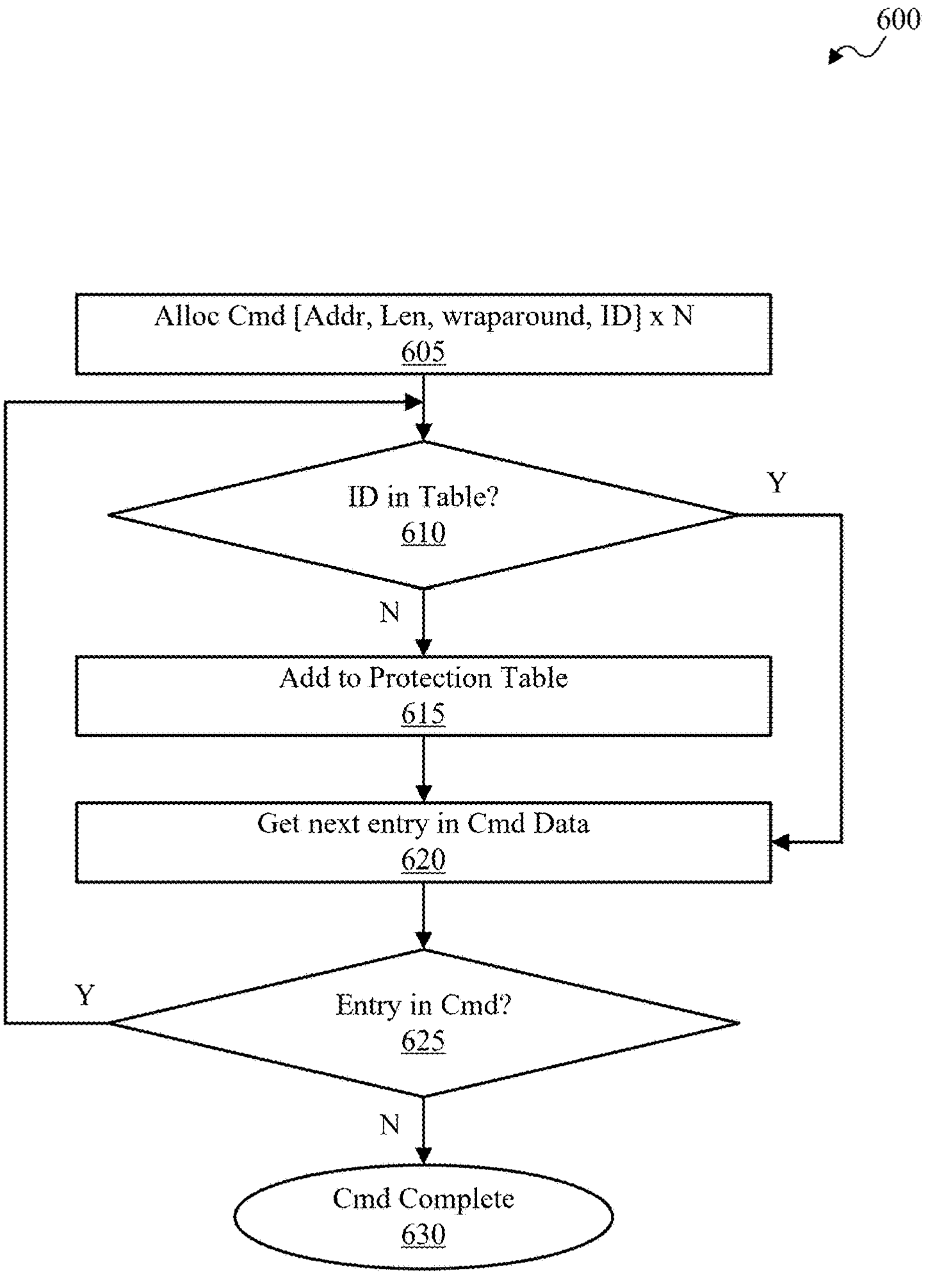
FIG. 6 depicts a flow diagram illustrating an example method associated with the disclosed systems, in accordance with example implementations described herein.

FIG. 6 depicts a flow diagram illustrating an example method 600 associated with the disclosed systems, in accordance with example implementations described herein. In some configurations, one or more aspects of method 600 may be implemented by or in conjunction with prefetch controller 140 of FIG. 1 and/or prefetch controller 230 of FIG. 2. In some configurations, one or more aspects of method 600 may be implemented by or in conjunction with machine 105, components of machine 105, or any combination thereof. The depicted method 600 is just one implementation and one or more operations of method 600 may be rearranged, reordered, omitted, and/or otherwise modified such that other implementations are possible and contemplated.

At 605, method 600 may include receiving one or more allocation commands (e.g., N allocation commands, where N is a positive integer that is based on the number of commands received from a host; 1, 2, 4, 10, 20 commands, etc.). For example, a host may send an allocation command to a memory device (e.g., wide-IO NAND device, memory module 305, NAND 320). In some cases, the allocation command may include a starting address, a length of the allocation, a secure prefetch flag (e.g., secure prefetch indicator), and/or an allocation ID.

At 610, method 600 may include determining whether an ID is included in a table. For example, a NAND controller (e.g., NAND controller 325) may determine whether an allocation ID (e.g., embedded in an allocation command) is included in a protection table (e.g., protection table 415).

At 615, method 600 may include adding information from the allocation command (e.g., starting address, length, allocation ID) to the protection table. For example, when the NAND controller determines that the allocation ID is not included in the protection table, the NAND controller may add the information from the allocation command to the protection table.

At 620, method 600 may include getting a next entry in command data. For example, when the NAND controller determines that the allocation ID of a first allocation command is included in the protection table (e.g., already in the protection table or added to the protection table at 615), the NAND controller may retrieve a second allocation command (e.g., a next allocation command in a batch of allocation commands received at 605).

At 625, method 600 may include determining whether a next command exists. For example, the NAND controller may determine whether another allocation command is pending processing, or whether all the allocation commands received in a batch have been processed. When the NAND controller determines that another allocation command is pending processing, the NAND controller may return to 610 to process the next allocation command.

At 630, method 600 may include ending the processing of a batch of allocation commands (e.g., one or more ("N") allocation commands). For example, when the NAND controller determines that no more allocation commands are pending processing, then the NAND controller may end processing for that batch of allocation commands.

Figure 7:
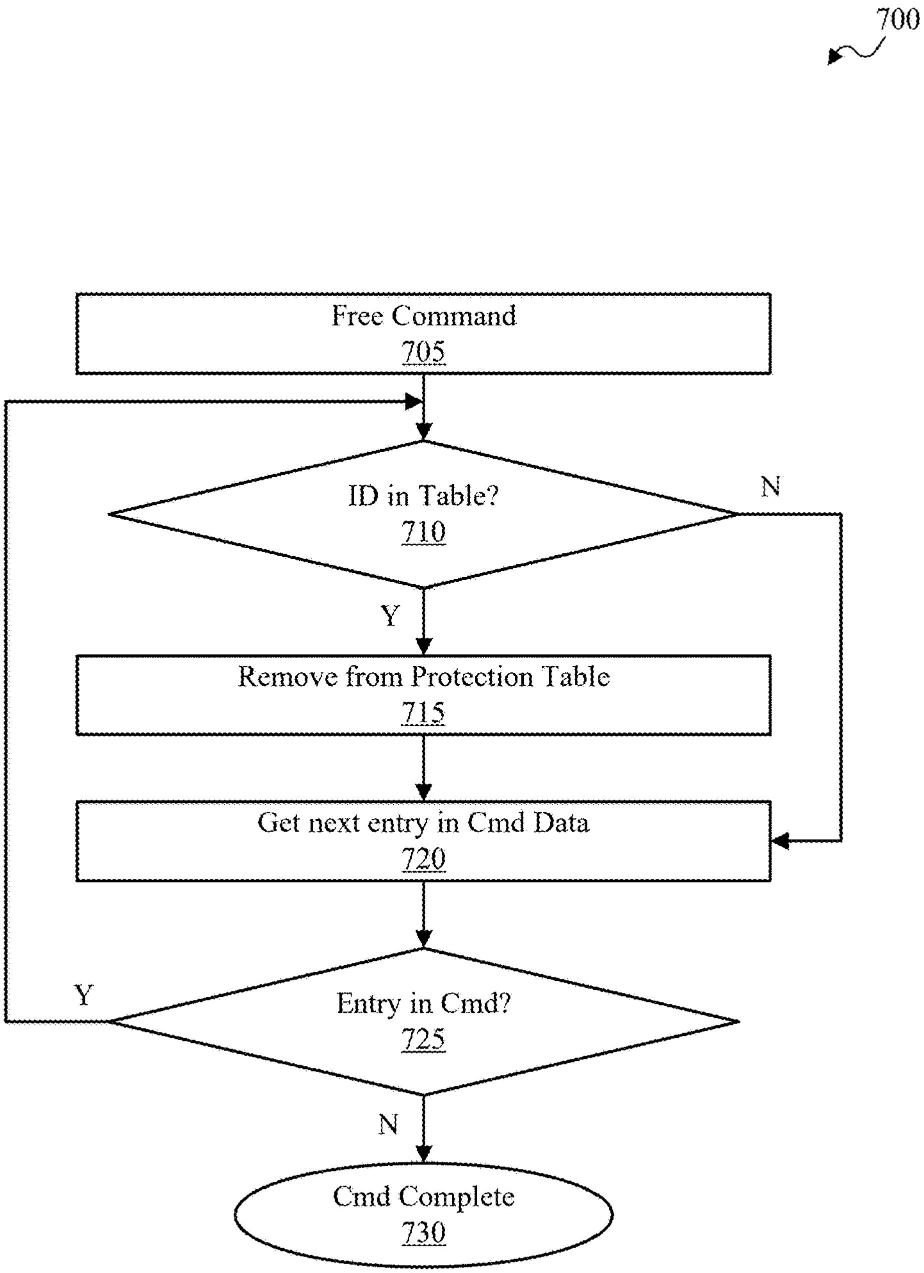
FIG. 7 depicts a flow diagram illustrating an example method associated with the disclosed systems, in accordance with example implementations described herein.

FIG. 7 depicts a flow diagram illustrating an example method 700 associated with the disclosed systems, in accordance with example implementations described herein. In some configurations, one or more aspects of method 700 may be implemented by or in conjunction with prefetch controller 140 of FIG. 1 and/or prefetch controller 230 of FIG. 2. In some configurations, one or more aspects of method 700 may be implemented by or in conjunction with machine 105, components of machine 105, or any combination thereof. The depicted method 700 is just one implementation and one or more operations of method 700 may be rearranged, reordered, omitted, and/or otherwise modified such that other implementations are possible and contemplated.

At 705, method 700 may include receiving a free command (e.g., one or more free commands). For example, a host may send a free command to a memory device (e.g., wide-IO NAND device, memory module 305, NAND 320). In some cases, the free command may include a starting address, a length of allocation, and/or an allocation ID. In some examples, the host may send one or more free commands (e.g., a batch of free commands) to the memory device.

At 710, method 700 may include determining whether an ID is included in a table. For example, a NAND controller (e.g., NAND controller 325) may determine whether an allocation ID (e.g., embedded in a free command) is included in a protection table (e.g., protection table 415).

At 715, method 700 may include removing information from a protection table. For example, when the NAND controller determines that an allocation ID (e.g., an allocation included in a free command) is included in the protection table, the NAND controller may remove the information (e.g., starting address, length, allocation ID) from the protection table.

At 720, method 700 may include getting a next entry in the command data. For example, when the NAND controller determines that the allocation ID of a first free command is not in the protection table (e.g., not in the protection table at 710 or removed to the protection table at 715), the NAND controller may retrieve a second free command (e.g., a next free command in a batch of free commands received at 705).

At 725, method 700 may include determining whether a next command exists. For example, the NAND controller may determine whether another free command is pending processing, or whether all the free commands received in a batch have been processed. When the NAND controller determines that another free command is pending processing, the NAND controller may return to 710 to process the next free command.

At 730, method 700 may include ending the processing of a batch of free commands (e.g., one or more free commands). For example, when the NAND controller determines that no more free commands are pending processing, then the NAND controller may end processing for that batch of free commands.

Figure 8:
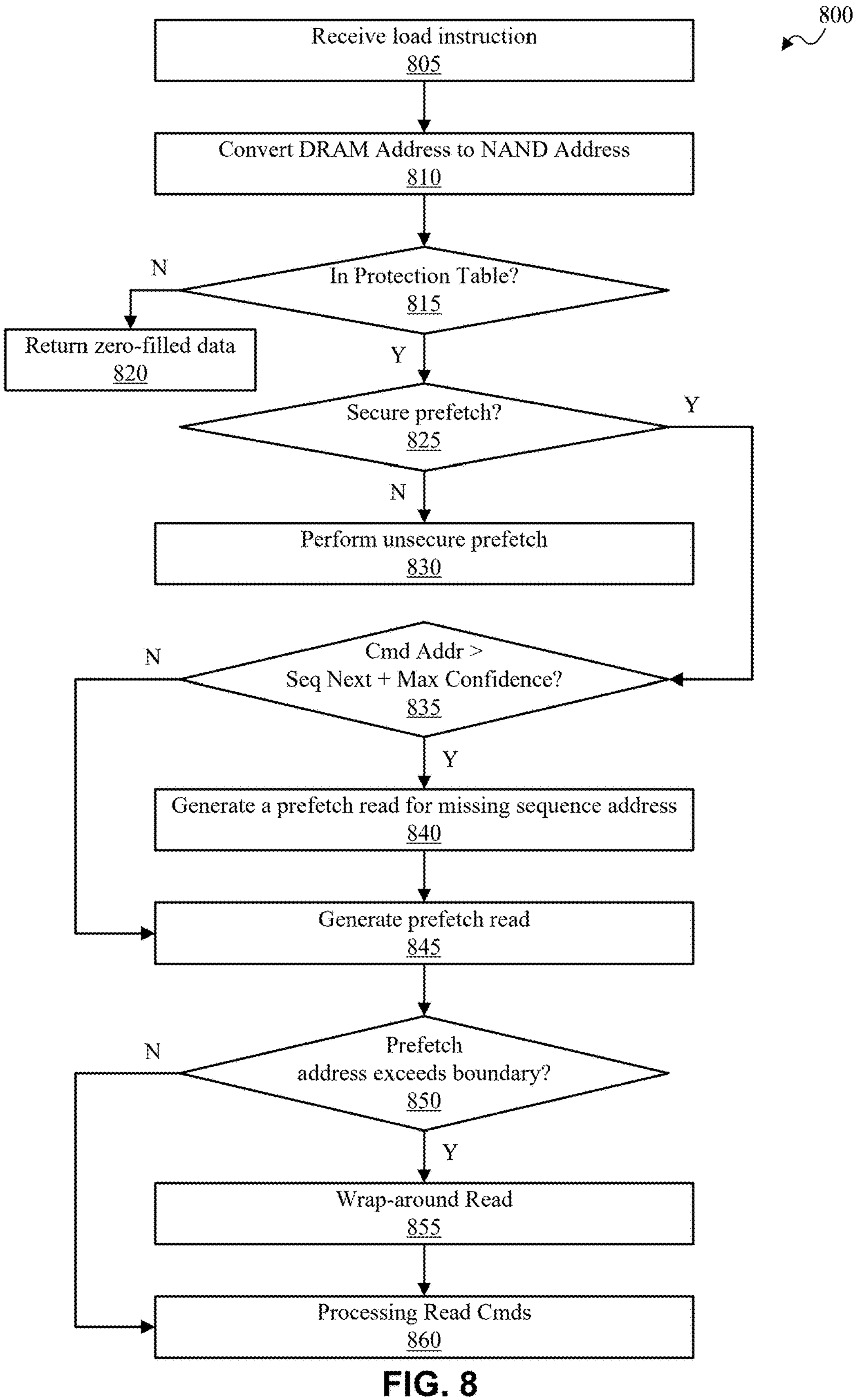
FIG. 8 depicts a flow diagram illustrating an example method associated with the disclosed systems, in accordance with example implementations described herein.

FIG. 8 depicts a flow diagram illustrating an example method 800 associated with the disclosed systems, in accordance with example implementations described herein. In some configurations, one or more aspects of method 800 may be implemented by or in conjunction with prefetch controller 140 of FIG. 1 and/or prefetch controller 230 of FIG. 2. In some configurations, one or more aspects of method 800 may be implemented by or in conjunction with machine 105, components of machine 105, or any combination thereof. The depicted method 800 is just one implementation and one or more operations of method 800 may be rearranged, reordered, omitted, and/or otherwise modified such that other implementations are possible and contemplated.

At 805, method 800 may include receiving a load instruction. For example, a host may send a load instruction to a memory device (e.g., wide-IO NAND device, memory module 305, NAND 320). In some cases, an application of a host may issue the load instruction, which may include a DRAM address and a length (e.g., DRAM read command).

At 810, method 800 may include converting a DRAM address to a NAND address. For example, the memory device may convert the DRAM address of a load instruction to a NAND address. In some cases, a NAND controller of the memory device may receive the load instruction, identify a DRAM address from the load instruction (e.g., based on parsing the load instruction), and convert the DRAM address to a NAND address. For example, a memory module may include DRAM memory and NAND memory. The DRAM address may be an address of the DRAM memory, and the NAND address may be an address of the NAND memory.

At 815, method 800 may include determining whether the NAND address is associated with an entry of a protection table (e.g., protection table 415). For example, the NAND controller may search the protection table to determine whether the NAND address is associated with a memory region that is registered in the protection table. In some cases, an entry for an allocated memory region may include a starting address and a length. The NAND controller may determine whether the NAND address matches the starting address or an address within the memory region (e.g., an address within a memory region that starts at the starting address and spans for the indicated length).

At 820, method 800 may include returning zero-filled data when the NAND address is not associated with an entry of the protection table. A NAND address not being associated with an entry of the protection table may indicate that the memory request for that NAND address is not from a reliable source (e.g., may indicate malware, unauthorized access attempt, etc.). Accordingly, when the NAND controller determines that NAND address is not associated with an entry of the protection table, the request may be discarded.

At 825, method 800 may include determining whether a secure prefetch flag is set. For example, the NAND controller may determine whether a secure prefetch flag is set in the protection table for the NAND address. The NAND controller may perform a secure prefetch when the secure prefetch flag is set (e.g., binary "1" for a given entry), and may perform an unsecure prefetch when the secure prefetch flag is not set (e.g., binary "0" for a given entry).

At 830, method 800 may include performing an unsecure prefetch. For example, when the NAND controller determines that the NAND address is not associated with an entry of a protection table, the NAND controller may perform an unsecure prefetch operation. In some cases, the unsecure prefetch operation may include determining whether the NAND address matches a next address indicated in a pattern table (e.g., access pattern table 440). In some cases, the next address may be based on a pattern sequence that NAND controller 325 learns based on monitoring the application that provides the load instruction at 805. For example, the NAND address matching the next address may indicate that the application accesses memory based on a sequential memory access pattern. In some cases, the address of a load instruction may indicate a current address and the next address may indicate the next address after the current address in the pattern sequence.

Based on the unsecure prefetch, when the NAND address matches the next address, then the NAND controller may generate a read for prefetch. The prefetch address may be equal to the NAND address plus a confidence value (e.g., prefetch confidence, entry confidence value). In some cases, the next address may be stored in the pattern table together with an entry confidence value. For example, a first entry of the pattern table may include a first confidence value, a second entry of the pattern table may include a second confidence value, and so on. Based on setting the prefetch address, the NAND controller may increment the entry confidence value for a subsequent prefetch operation (e.g., entry confidence=entry confidence+1, where 1 indicates a next memory location in the pattern sequence). For example, if one memory location is 4 KB, and the current entry confidence is 4 KB, then (entry confidence=entry confidence+1) may set the entry confidence of 4 KB to 8 KB, and so on. The NAND controller may execute the read command for the prefetch operation (e.g., one or more read commands in a batch of prefetch operations).

Based on the unsecure prefetch, when the NAND address does not match the next address, then the NAND controller may set a next address to the NAND address plus a length indicated in the load instruction. The NAND controller may insert the next address in the pattern table, setting the confidence value to 1, where 1 indicates one memory location in the pattern sequence (e.g., 4 KB). In some cases, the NAND controller may determine whether a head confidence value is greater than 3 (e.g., greater than 12 KB when each memory location is 4 KB). When the head confidence is less than 3, the NAND controller may discard the next address from the pattern table and issue any pending prefetch read commands for processing. When the head confidence is greater than 3, then the NAND controller may maintain the next address in the pattern table and then reset the head confidence (e.g., head confidence=head confidence−3) and issue any pending prefetch read commands for processing.

At 835, method 800 may include determining whether a command address is greater than a next address plus a maximum confidence value. For example, the NAND controller may determine whether the NAND address is greater or exceeds a memory location that is based on a next address in the pattern table plus a maximum confidence value (e.g., maximum prefetch confidence). The next address may be based on a pattern sequence that NAND controller 325 learns based on monitoring the application. In some cases, a command address may be associated with a location where data is to be prefetched by the NAND controller. However, the NAND controller may perform 835 to determine whether the NAND controller is prefetching too far ahead, which may result in the prefetched data being discarded before it is called for by the program. Thus, the NAND controller may determine whether the command address is greater than the next address in the pattern table plus a maximum confidence value, which indicates to the NAND controller that the prefetch location may be too far ahead.

At 840, method 800 may include generating a prefetch read based on a previous address. For example, when the NAND controller determines at 835 that the NAND address is greater than (e.g., greater than or equal to) a next address plus a maximum confidence value, the NAND controller may generate a read for a missing address (e.g., skipped address based on an out-of-sequence NAND address). The NAND controller may generate the read for the skipped address based on a previous prefetch address. For instance, the NAND controller may compensate for a prefetch operation that overshoots or exceeds the memory being used by the application. For example, when the prefetch distance is too far ahead (e.g., based on the pattern sequence of the application), the values may sit in cache for too long and may get evicted before they are used by the processor. Accordingly, the NAND controller may perform a prefetch based on a previous read where the prefetch address (e.g., missing prefetch address or skipped prefetch address) is set equal to a next address (e.g., next sequence 525) plus the maximum confidence (e.g., instead of using the NAND address for the prefetch). In some cases, the NAND controller may set a previous prefetch length (e.g., prefetch distance) equal to the NAND address minus the prefetch previous address. In some cases, the NAND controller may set a previous prefetch length equal to the NAND address minus the prefetch previous address plus 1, where "1" may represent a logical amount of data known to the NAND controller that is prefetched based on some prefetch size or prefetch distance (e.g., "1" represents 1 KB, 4 KB, 16 KB, etc.).

At 845, method 800 may include generating a prefetch read. For example, when the NAND controller determines at 835 that the NAND address is less than (e.g., less than or equal to) a next address plus a maximum confidence value (or the NAND controller generates a prefetch read at 840 based on a previous read), the NAND controller may generate a read for a prefetch address. For instance, the NAND controller may generate a read for a NAND prefetch (e.g., prefetch data from an allocated memory region of wide-IO NAND). In some cases, the NAND controller may set the prefetch address equal to the NAND address plus a maximum confidence value. In some cases, the NAND controller may set the prefetch length (e.g., prefetch distance) to 1 (e.g., 4 KB). In some cases, the NAND controller may increment a next address for a subsequent prefetch operation (e.g., entry next=entry next+1, where 1 indicates a next memory location in the pattern sequence).

At 850, method 800 may include determining whether the prefetch address exceeds a boundary. For example, the NAND controller may determine whether the prefetch address is greater than or equal to the starting address plus the allocation length of a memory region allocated to the application. For example, the protection table (protection table 415) may store an entry for the allocated memory region that includes a starting address of the memory region, a length of the memory region, a secure prefetch indicator, an allocation ID of the memory region, and/or a next memory address. When the prefetch address exceeds the end of the memory region (e.g., starting address plus length), then the NAND controller may determine that the prefetch address exceeds the boundary of the memory region allocated to the application (e.g., exceeds the memory region associated with the load instruction and the data being prefetched based on the load instruction).

At 855, method 800 may include a wrap-around read. For example, when the NAND controller determines that the prefetch address exceeds the boundary of the memory region allocated to the application, then the NAND controller may wrap around the prefetch read to the beginning of the memory region. For instance, the NAND controller may set the prefetch address equal to the starting address.

At 860, method 800 may include processing one or more read commands. For example, a NAND controller may generate one or more prefetch read commands based on the NAND controller receiving one or more load instructions from the host. In some cases, the NAND controller may provide the prefetched data to the host via a data buffer (e.g., data buffer 450).

Figure 9:
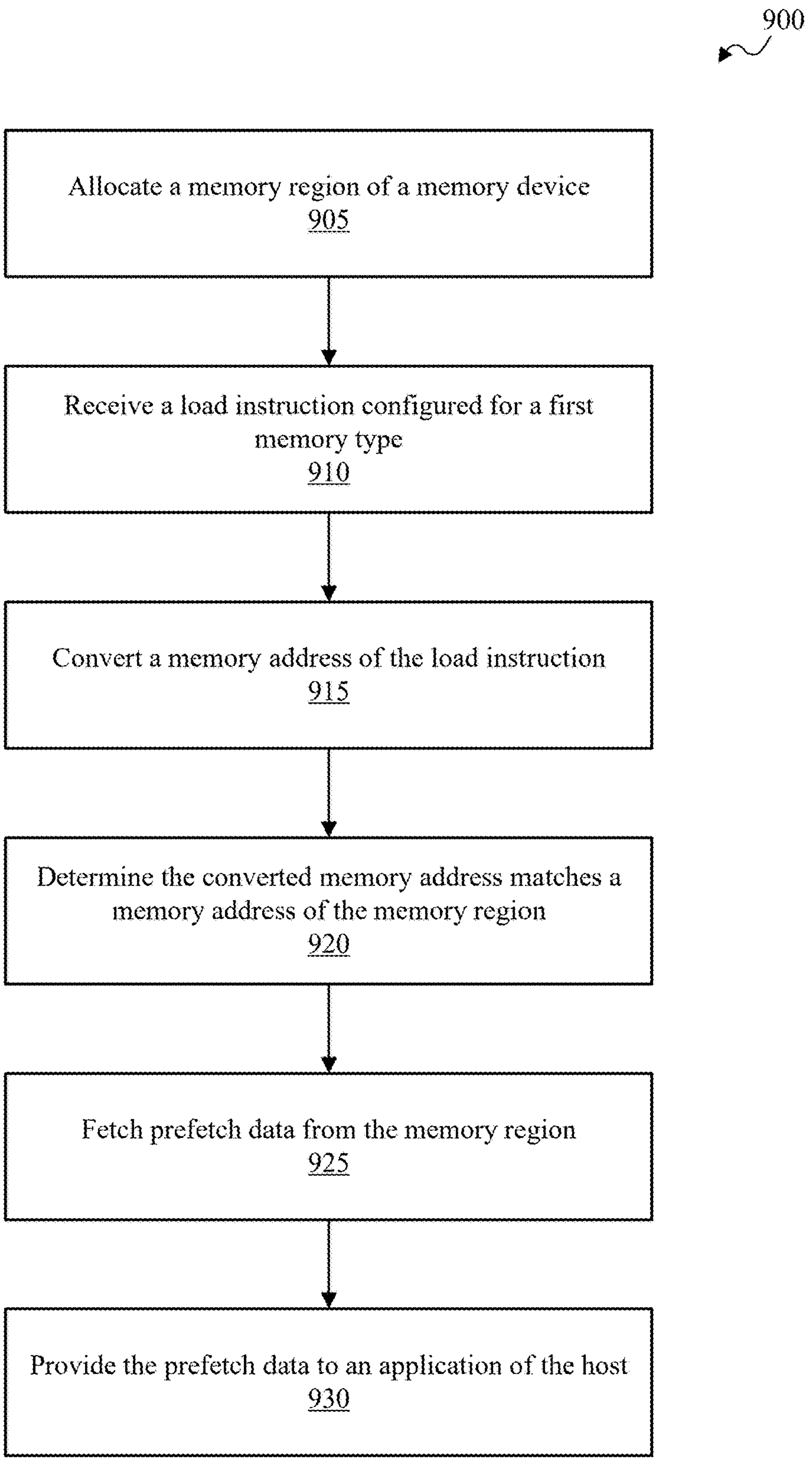
FIG. 9 depicts a flow diagram illustrating an example method associated with the disclosed systems, in accordance with example implementations described herein.

FIG. 9 depicts a flow diagram illustrating an example method 900 associated with the disclosed systems, in accordance with example implementations described herein. In some configurations, one or more aspects of method 900 may be implemented by or in conjunction with prefetch controller 140 of FIG. 1 and/or prefetch controller 230 of FIG. 2. In some configurations, one or more aspects of method 900 may be implemented by or in conjunction with machine 105, components of machine 105, or any combination thereof. The depicted method 900 is just one implementation and one or more operations of method 900 may be rearranged, reordered, omitted, and/or otherwise modified such that other implementations are possible and contemplated.

At 905, method 900 may include allocating a memory region of a first memory type. For example, a NAND controller (e.g., NAND controller 325) may allocate a memory region of a first memory type of a memory module (e.g., NAND 320) based on an allocation command received from a host of the memory module.

At 910, method 900 may include receiving a load instruction configured for a second memory type. For example, the NAND controller may receive, at a controller of the first memory type (e.g., NAND controller 325) and from an application of the host, a load instruction configured for the second memory type (e.g., DRAM 315).

At 915, method 900 may include converting a memory address. For example, the NAND controller may convert a memory address, included in the load instruction and configured for the second memory type, from the second memory type to a converted memory address of the first memory type.

At 920, method 900 may include determining the converted memory address matches a memory address of the memory region. For example, the NAND controller may determine the converted memory address matches a memory address of the memory region (e.g., matches a memory address registered in a protection table).

At 925, method 900 may include fetching prefetch data from the memory region. For example, the NAND controller may fetch prefetch data from the memory region based on predicting that the application will use the prefetch data based on the load instruction.

At 930, method 900 may include providing the prefetch data to an application of the host. For example, the NAND controller may provide the prefetch data to an application of the host based on the load instruction.

Figure 10:
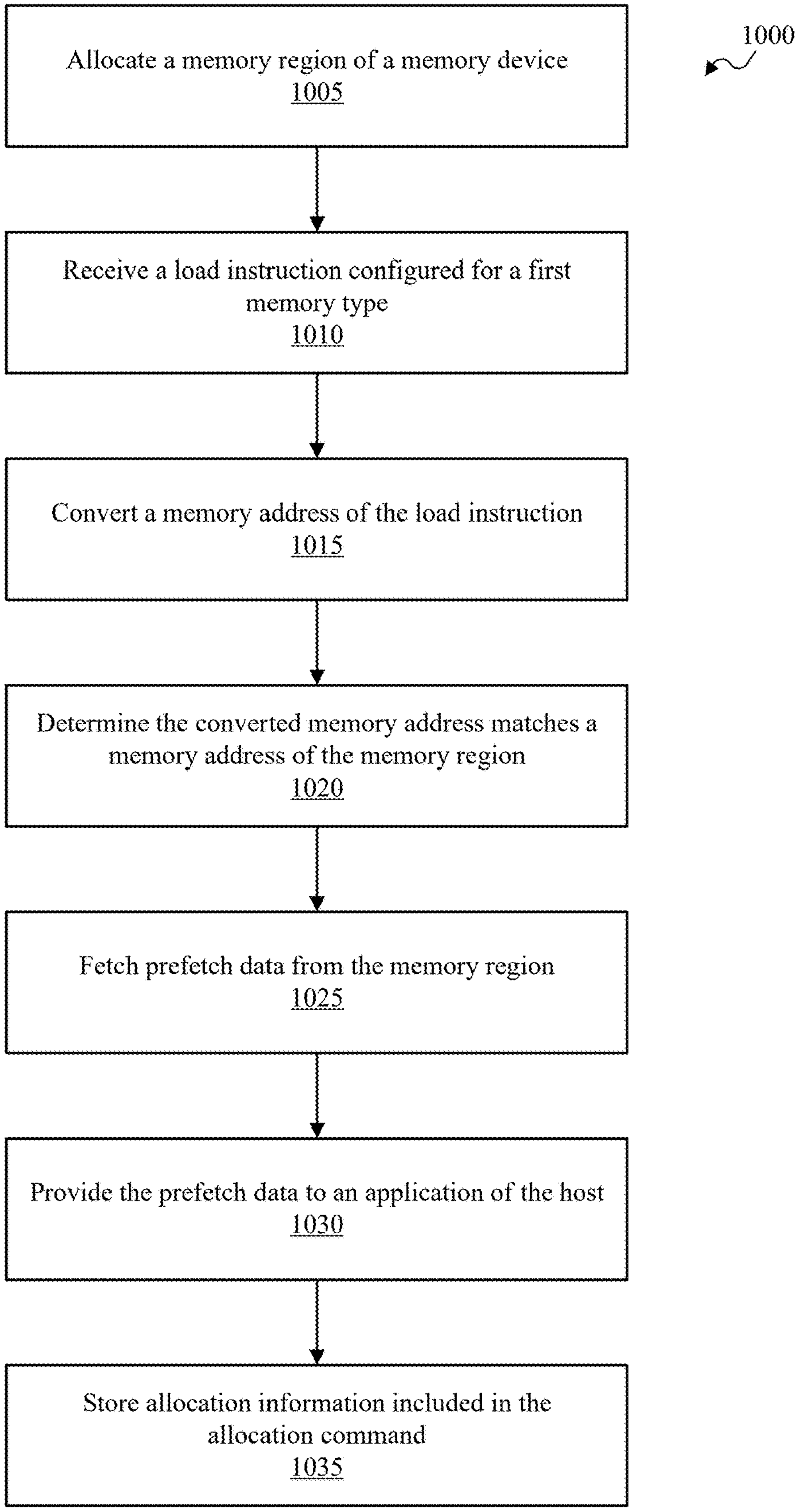
FIG. 10 depicts a flow diagram illustrating an example method associated with the disclosed systems, in accordance with example implementations described herein.

FIG. 10 depicts a flow diagram illustrating an example method 1000 associated with the disclosed systems, in accordance with example implementations described herein. In some configurations, one or more aspects of method 1000 may be implemented by or in conjunction with prefetch controller 140 of FIG. 1 and/or prefetch controller 230 of FIG. 2. In some configurations, one or more aspects of method 1000 may be implemented by or in conjunction with machine 105, components of machine 105, or any combination thereof. The depicted method 1000 is just one implementation and one or more operations of method 1000 may be rearranged, reordered, omitted, and/or otherwise modified such that other implementations are possible and contemplated.

At 1005, method 1000 may include allocating a memory region of a first memory type. For example, a NAND controller (e.g., NAND controller 325) may allocate a memory region of a first memory type (e.g., NAND 320) of a memory module based on an allocation command received from a host of the memory module.

At 1010, method 1000 may include receiving a load instruction configured for a second memory type. For example, the NAND controller may receive, at a controller of the first memory type and from an application of the host, a load instruction configured for a second memory type (e.g., DRAM 315).

At 1015, method 1000 may include converting a memory address. For example, the NAND controller may convert a memory address, in the load instruction and configured for the second memory type, from the second memory type to a converted memory address of the first memory type.

At 1020, method 1000 may include determining the converted memory address matches a memory address of the memory region. For example, the NAND controller may determine the converted memory address matches a memory address of the memory region (e.g., matches a memory address registered in a protection table).

At 1025, method 1000 may include fetching prefetch data from the memory region. For example, the NAND controller may fetch prefetch data from the memory region based on predicting that the application will use the prefetch data based on the load instruction.

At 1030, method 1000 may include providing the prefetch data to an application of the host. For example, the NAND controller may provide the prefetch data to an application of the host based on the load instruction.

At 1035, method 1000 may include storing allocation information that is included in the allocation command. For example, the NAND controller may store allocation information in a data protection table. The allocation information may be included in the allocation command, and may include at least one of a starting address of the memory region, a length of the memory region, a memory region identifier (ID), a secure prefetch indicator, and/or a next memory address based on the starting address plus an offset, where the offset may be based on a data access pattern of the application.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wired and/or wireless communication device such as a switch, router, network interface controller, cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be wireless, wired, mobile, and/or stationary.

As used within this document, the term "communicate" is intended to include transmitting, or receiving, or both transmitting and receiving. Similarly, the bidirectional exchange of data between two devices (both devices transmit and receive during the exchange) may be described as 'communicating', when only the functionality of one of those devices is being claimed. The term "communicating" as used herein with respect to wired and/or wireless communication signals includes transmitting the wired and/or wireless communication signals and/or receiving the wired and/or wireless communication signals. For example, a communication unit, which is capable of communicating wired and/or wireless communication signals, may include a wired/wireless transmitter to transmit communication signals to at least one other communication unit, and/or a wired/wireless communication receiver to receive the communication signal from at least one other communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Arca Network (WVAN), a Local Area Network (LAN), a Wireless LAN (WLAN), a Personal Arca Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples as set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of secure prefetching in a memory device, the method comprising:

allocating a memory region of a first memory type of the memory device based on an allocation command received from a host of the memory device;

receiving, at a controller of the first memory type and from an application of the host, a load instruction configured for a second memory type different from the first memory type;

converting a memory address, of the second memory type and included in the load instruction, from the second memory type to a converted memory address of the first memory type;

determining the converted memory address matches a memory address of the memory region;

fetching prefetch data from the memory region based on predicting that the application will use the data based on the load instruction; and providing the prefetch data to the application of the host based on the load instruction.

2. The method of claim 1, further comprising storing, in a data protection table, allocation information that is included in the allocation command, the allocation information comprising at least one of a starting address of the memory region, a length of the memory region, a memory region identifier (ID), a secure prefetch indicator, or a next memory address based on the starting address plus an offset, the offset being based on a data access pattern of the application.

3. The method of claim 2, wherein the data protection table is stored on the controller of the first memory type, the data protection table being managed by the host based on a command communicated via a control address space of the memory device.

4. The method of claim 2, further comprising removing the allocation information from the data protection table based on receiving a free command, the free command indicating at least one of the starting address of the memory region, the length of the memory region, the secure prefetch indicator, or the memory region ID, the free command and the allocation command being received via a control address space of the host.

5. The method of claim 2, wherein an address where the prefetch data is fetched is based on at least one of: the next memory address and a prefetch confidence value, or the converted memory address and the prefetch confidence value.

6. The method of claim 2, wherein an address where the prefetch data is fetched is at the starting address of the memory region based on determining that an estimated location for the data being prefetched goes beyond a boundary of the memory region, the memory region comprising application data associated with the application.

7. The method of claim 1, further comprising using a data transfer protocol of the second memory type to provide the prefetch data to the application of the host, wherein the data transfer protocol comprises a dynamic random-access memory data transfer protocol.

8. The method of claim 1, wherein:

providing the prefetch data to the application is based on storing the prefetch data fetched from the memory region in a data buffer of the first memory type, the data buffer and the controller of the first memory type is managed by the host based on commands communicated via a control address space of the memory device, the prefetch data is provided to the application via the data address space of the host, and the load instruction is received via the data address space of the host.

9. The method of claim 1, further comprising storing a data access pattern associated with the application in an access pattern table of the first memory type, wherein predicting that the application will use the prefetch data is based on the controller of the first memory type monitoring the application and detecting the data access pattern according to the monitoring.

10. The method of claim 1, wherein:

the first memory type comprises NAND flash memory, and the second memory type comprises dynamic random-access memory.

11. A device comprising:

one or more processors; and memory storing instructions that, when executed by the one or more processors, cause the device to:

allocate a memory region of a first memory type of the memory device based on an allocation command received from a host of the memory device;

receive, at a controller of the first memory type and from an application of the host, a load instruction configured for a second memory type different from the first memory type;

convert a memory address, of the second memory type and included in the load instruction, from the second memory type to a converted memory address of the first memory type;

determine the converted memory address matches a memory address of the memory region;

fetch prefetch data from the memory region based on predicting that the application will use the data based on the load instruction; and provide the prefetch data to the application of the host based on the load instruction.

12. The device of claim 11, wherein the instructions, when executed by the one or more processors, further cause the device to store, in a data protection table, allocation information that is included in the allocation command, the allocation information comprising at least one of a starting address of the memory region, a length of the memory region, a memory region identifier (ID), a secure prefetch indicator, or a next memory address based on the starting address plus an offset, the offset being based on a data access pattern of the application.

13. The device of claim 12, wherein the data protection table is stored on the controller of the first memory type, the data protection table being managed by the host based on a command communicated via a control address space of the memory device.

14. The device of claim 12, wherein the instructions, when executed by the one or more processors, further cause the device to, further comprising removing the allocation information from the data protection table based on receiving a free command, the free command indicating at least one of the starting address of the memory region, the length of the memory region, the secure prefetch indicator, or the memory region ID, the free command and the allocation command being received via a control address space of the host.

15. The device of claim 12, wherein an address where the prefetch data is fetched is based on at least one of: the next memory address and a prefetch confidence value, or the converted memory address and the prefetch confidence value.

16. The device of claim 12, wherein an address where the prefetch data is fetched is at the starting address of the memory region based on determining that an estimated location for the data being prefetched goes beyond a boundary of the memory region, the memory region comprising application data associated with the application.

17. The device of claim 11, wherein the instructions, when executed by the one or more processors, further cause the device to use a data transfer protocol of the second memory type to provide the prefetch data to the application of the host, wherein the data transfer protocol comprises a dynamic random-access memory data transfer protocol.

18. A non-transitory computer-readable medium storing code that comprises instructions executable by a processor to:

allocate a memory region of a first memory type of a memory device based on an allocation command received from a host of the memory device;

receive, at a controller of the first memory type and from an application of the host, a load instruction configured for a second memory type different from the first memory type;

convert a memory address, of the second memory type and included in the load instruction, from the second memory type to a converted memory address of the first memory type;

determine the converted memory address matches a memory address of the memory region;

fetch prefetch data from the memory region based on predicting that the application will use the data based on the load instruction; and provide the prefetch data to the application of the host based on the load instruction.

19. The non-transitory computer-readable medium of claim 18, wherein the code includes further instructions executable by the processor to store, in a data protection table, allocation information that is included in the allocation command, the allocation information comprising at least one of a starting address of the memory region, a length of the memory region, a memory region identifier (ID), a secure prefetch indicator, or a next memory address based on the starting address plus an offset, the offset being based on a data access pattern of the application.

20. The non-transitory computer-readable medium of claim 19, wherein the data protection table is stored on the controller of the first memory type, the data protection table being managed by the host based on a command communicated via a control address space of the memory device.

* * * * *